(12) United States Patent
Sundararam et al.

(10) Patent No.: US 10,884,788 B2
(45) Date of Patent: Jan. 5, 2021

(54) ON-DEMAND CODE EXECUTION WITH LIMITED MEMORY FOOTPRINT

(71) Applicant: Amazon Technologies, Inc., Seattle, WA (US)

(72) Inventors: Arunachalam Sundararam, Redmond, WA (US); Erik Jacob Sipsma, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 126 days.

(21) Appl. No.: 15/944,454

(22) Filed: Apr. 3, 2018

(65) Prior Publication Data
US 2019/0303195 A1 Oct. 3, 2019

(51) Int. Cl.
G06F 9/48 (2006.01)
G06F 9/445 (2018.01)
G06F 9/50 (2006.01)

(52) U.S. Cl.
CPC ........ *G06F 9/4843* (2013.01); *G06F 9/44505* (2013.01); *G06F 9/5072* (2013.01); *G06F 9/5077* (2013.01)

(58) Field of Classification Search
None
See application file for complete search history.

(56) References Cited

U.S. PATENT DOCUMENTS

| 9,323,556 B2 | 4/2016 | Wagner |
| 2017/0177413 A1 | 6/2017 | Wisniewski et al. |
| 2017/0371706 A1 | 12/2017 | Wagner et al. |
| 2018/0150325 A1* | 5/2018 | Kuo ............... G06F 9/5005 |

OTHER PUBLICATIONS

Search Report and Written Opinion dated Jul. 3, 2019 issued in corresponding PCT/US2018/025201.

* cited by examiner

*Primary Examiner* — Eric C Wai
(74) *Attorney, Agent, or Firm* — Knobbe Martens Olson & Bear LLP

(57) ABSTRACT

Systems and methods are described for management of a coordinated environment for execution of on-demand code with reduced memory footprint provided. A coordinator receives individual on-demand code execution requests or tasks from coordinated devices. The coordinate can process the on-demand code execution requests to associate at least a subset of the on-demand code execution with one or more groups sharing executable code. The coordinated device can implement the execution of the individual tasks without requiring a separate loading and execution of the on-demand executable code. Accordingly, the coordinated device may be implemented on computing devices having more limited computing resources by reducing the memory footprint required to execute the on-demand task.

20 Claims, 8 Drawing Sheets

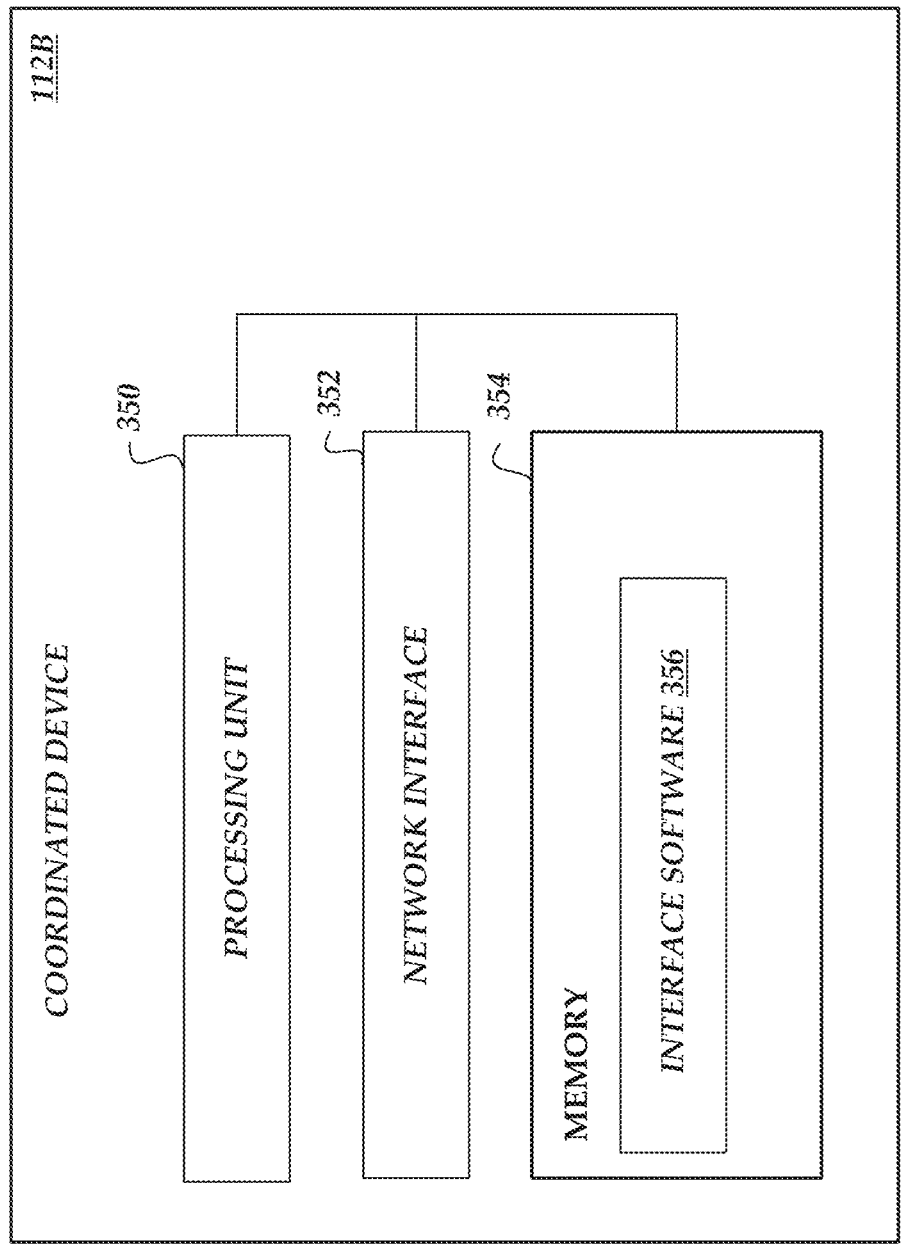

ON-DEMAND CODE EXECUTION WITH LIMITED MEMORY FOOTPRINT

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some environments, the computing devices that communicate via the communication network can correspond to devices having a primary function as a computing device, such as a desktop personal computer. In other environments, at least some portion of the computing devices that communication via the communication network can correspond to embedded devices or thin devices that have at least one alternative primary function, such as household appliances having a separate primary purpose (e.g., a thermostat or refrigerator) while also providing at least limited computing functionality. In some instances, the local user interfaces of these embedded devices or thin devices are limited, and thus remote management may be required to implement some functions of these devices. However, remote management can in some instances be problematic, due to latency in communications with a remote management device and potential for private information to be inadvertently disclosed either at the remote management device or during communications with the remote management device. These issues may be more prevalent when the embedded devices or thin devices and the remote management device exist on separate communication networks or communicate over public communications networks.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIGS. 3A and 3B depict general architectures of coordinated devices managed by the coordinator of FIG. 1;

DETAILED DESCRIPTION

Figure 1:
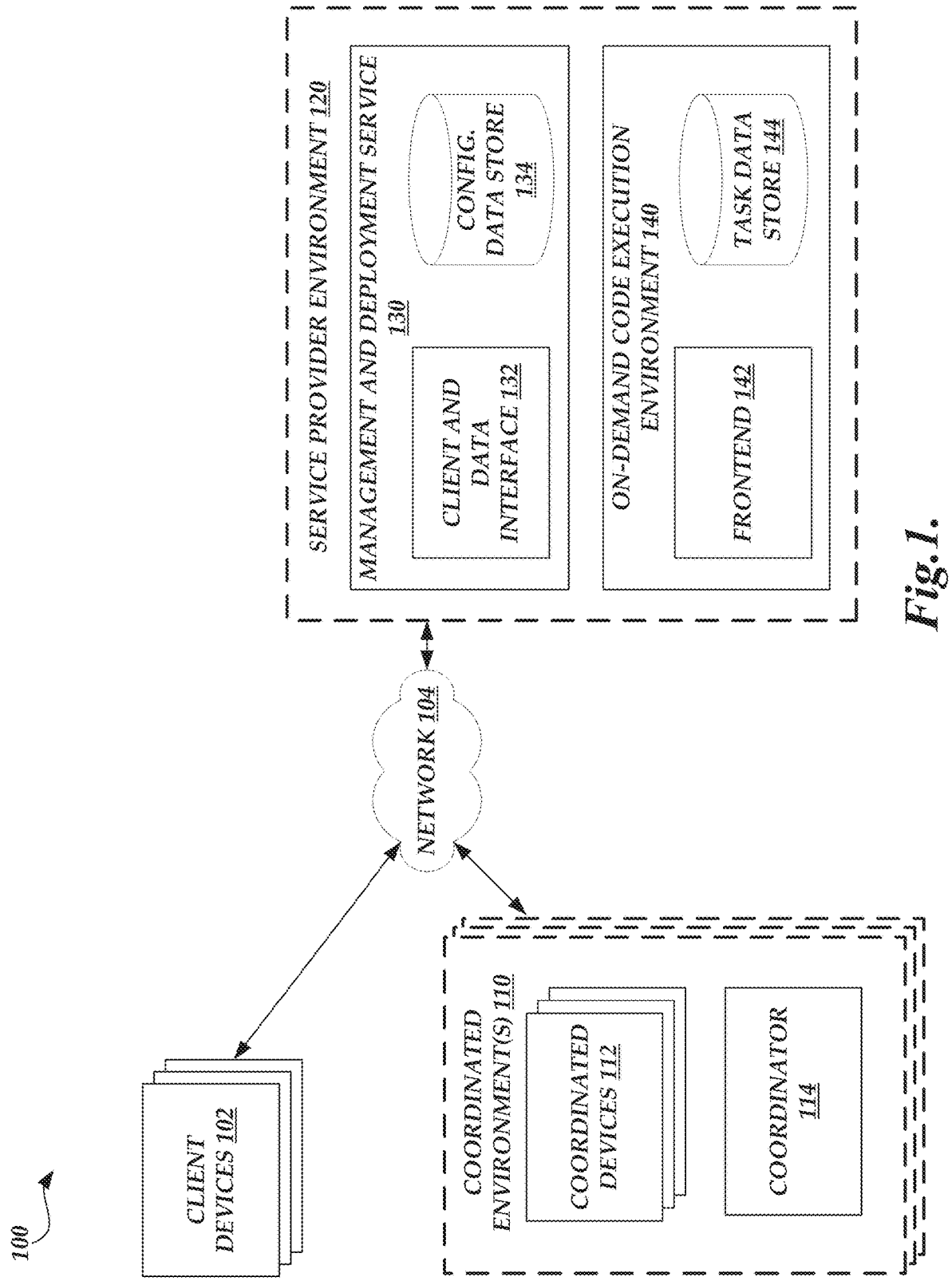
FIG. 1 is a block diagram depicting an illustrative environment in which a coordinator can operate to locally manage and coordinate operation of coordinated devices within a coordinated environment.

Generally described, the present application corresponds to the management of computing devices in a communication network. More specifically, aspects of the present application correspond to management of memory resources utilized to execute on-demand code in a coordinated environment. In accordance with aspects of the present disclosure, of the coordinated environment includes a coordinator present within a coordinated environment to control operation and functionality of coordinated devices within the coordinated environment. In some instances, the coordinator and coordinated devices may correspond to embedded devices or thin devices that have at least one alternative primary function, such as household appliances having a separate primary purpose. Such devices may in some instances be referred to as "Internet-of-Things" devices, or "IoT" devices. Coordinated devices may include limited local user interface capabilities, and may thus benefit from remote management. Additionally, the coordinator can include devices, such as tablet computing devices, that may be associated with more limited computing resources, such as processing, memory, or communication, relative to server-based computing devices.

The coordinator disclosed herein enables such remote management of coordinated devices locally, within an environment including the coordinator and the coordinated devices (such as a local area network, or "LAN," environment). In some embodiments and as will be described below, use of a coordinator can thus enable management of coordinated devices without requiring communications external to the local environment, thereby allowing a reduction in privacy risks and an increase in communication speed over the use of external or public communication networks. Further, a coordinator as disclosed herein may function as a localized on-demand code execution system, enabling rapid execution of portable segments of code to implement functions on the coordinator. These portable segments of code may be referred to herein as "tasks." In some instances, tasks may be utilized to coordinate functionality of a coordinated device, such as by changing the state of the device. For example, where a coordinated device is a network-enabled light, a task may function to change the state of the light (e.g., to "on" or "off") according to an input to the coordinator, such as the current time, a user input, or the state of another coordinated device. The coordinator may further enable communication coordinated devices and tasks according to a number of different protocols, and in some instances, provide translation functions between such protocols.

Still further, the coordinator may in some instances manage an execution location of a task, such that the task may be executed on the coordinator, on a coordinated device, or on a device of a remote environment (e.g., a remote network computing environment), according to capabilities of candidate devices and requirements for execution of the task. These tasks may in some instances be user-defined, enabling users to implement a variety of functionalities on the coordinator or coordinated devices, according to user-submitted code corresponding to the task. Thus, a coordinator may provide rapidly reconfigurable localized management of coordinated devices.

A coordinator may be associated with a network-based service that is instantiated on one or more components on the edge nodes of the service, which is different from a centralized authentication and authorization service. Illustratively, the service provider environment may be operated by a provider of the coordinator, and enable a user to specify various configuration parameters of the coordinator, such as the location of a coordinated environment for the coordinator, the coordinated devices within the environment, the tasks executable by a coordinator, how the coordinator should manage communications between devices, between tasks, or between devices and tasks, security information for the coordinator, or other parameters of the coordinator (such as metrics to be monitored at a coordinator or logging to be conducted at the coordinator). Because the coordinator itself may in some instances be associated with limited localized user interfaces, the service provider environment may enable a user, via a client device, to submit a configuration for the coordinator, and to cause the coordinator to be automatically provisioned with the configuration. The service provider environment may further enable a single client device to manage multiple coordinators via a unified interface, and to quickly alter the configuration of a coordinator by deploying a new configuration, or by rolling-back or undoing prior deployments of configurations to the coordinator. Further details regarding a coordinator for implementing on-demand code can be found in co-pending U.S. patent application Ser. No. 15/362,696, entitled "ON-DEMAND CODE EXECUTION IN A LOCALIZED DEVICE COORDINATOR" and filed on Nov. 28, 2016, the entirety of which is hereby incorporated by reference.

In some instances, the service provider environment may provide functionalities similar or identical to the functionalities of the coordinator. For example, a coordinator may function at least in part based on execution of portable segments of code, or "tasks." Similarly, a server provider environment may include an on-demand code execution environment that functions to execute the same or similar tasks. Further details regarding such an on-demand code execution environment can be found within U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 ("the '556 patent"), the entirety of which is hereby incorporated by reference. In brief, to execute tasks, an on-demand code execution environment may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels.

Illustratively, the on-demand code execution environment may maintain a pool of virtual machine instances on one or more physical computing devices, where each virtual machine instance has one or more software components (e.g., operating systems, language runtimes, libraries, etc.) loaded thereon. When the on-demand code execution environment receives a request to execute the program code of a user (a "task"), which specifies one or more computing constraints for executing the program code of the user, the on-demand code execution environment may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution environment may include a virtual machine instance manager, as described in more detail in the '556 patent, that is configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in the '556 patent.

As discussed above, the coordinator may in some instances be configured to execute tasks locally (e.g., on the coordinator). Each submitted task by a coordinated device can include a handler that facilitates the execution the task by the coordinator and the generation of a process result responsive to the submitted task request. As described above, however, in some embodiments, coordinated devices can submit a number of tasks for execution at the coordinator that share at least some portion of executable code. For coordinators being implemented with more limited computing resources, as the number of tasks for execution increases, the computing resource demands, as memory, may exceed availability. Accordingly, the coordinator may not be able to properly execute all the submitted tasks or may execute submitted tasks in a less than efficient manner. Still further, for coordinators that include a computing device having an alternative function, such as a tablet computing device, scaling task execution can limit the ability for the coordinator to execute the alternative function. Accordingly, the operation of the coordinator and coordinated network can be impacted based on available computing resources.

Because an on-demand code execution environment as implemented by a coordinator may be associated with more limited computational resources than the on-demand code execution environment described in the '556 patent (which may be implemented, for example, in a data center), the coordinator may implement a scheduler to assist in prioritization of task executions. Specifically, a scheduler receives calls to execute tasks, and enqueue such calls as work items onto a work item queue. The scheduler may then selectively dequeuer calls from the work item queue according to a scheduling algorithm. Any number of scheduling algorithms may be utilized by the scheduler, such as first in, first out scheduling, earliest deadline first scheduling, shortest remaining time scheduling, fixed priority pre-emptive scheduling, and round-robin scheduling.

Illustratively, each scheduling algorithm may be implemented based on an amount of available compute resources to a coordinator, and an amount of resources needed to complete a task call (which may be set, for example, by an author of a task or an administrator of the coordinator, or may be estimated based on static or dynamic analysis of the task). In some instances, a scheduling algorithm may also be based at least in part on a priority assigned to the task by an author of the task, by an administrator of the coordinator, by a calling entity, etc. The scheduler may process a queue of work items according to the scheduling algorithm, and when a task call is selected for dequeing, cause completion of the task call by executing the task corresponding to the call (e.g., according to the parameters of the call). As further discussed, in accordance with aspects of the present application, the coordinator can facilitate the execution of additional tasks by replacing at least portions of individual tasks provided by one or more coordinated devices with multiple iterations of a group-based tasks.

To assist in execution of a task, a coordinator can further include a resource manager to monitor a state of compute resource usage at the coordinator and to manage generation, destruction, and maintenance of execution environments in which a task will execute. The execution environments can include any portion of memory logically allocated to a task execution. Illustratively, an execution environment may correspond to a "container," operating-system-level virtualization environment, or "sand box" environment, such as a "chroot jail" or a Python virtual environment "virtualenv." In other instances, an execution environment may correspond to a virtual machine environment (e.g., a JAVA virtual machine, a virtualized hardware device with distinct operating system, etc.). In still other instances, an execution environment may be a memory space allocated to an execution of a task, without necessarily utilizing virtualization. Illustratively, a resource manager may enable a scheduler to retrieve current compute resource availability information for a coordinator, such as an amount of available memory, processor cycles (e.g., of a central processing unit, graphical processing unit, etc.), network bandwidth, or other computing resources, in order to enable the scheduler to determine which task calls to dequeuer from a work item queue.

In some instances, the resource manager may provide other information to the scheduler, such as a listing of current task executions occurring at the coordinator. The resource manager may further receive and process requests from the scheduler to obtain an execution environment to which to pass a task call. Illustratively, where each task (individual or group-based) is executed in a separate execution environment, and where no execution environment exists for a given task, the resource manager may determine the resources needed for an execution of the given task (e.g., in terms of underlying compute resources, like processor capacity and memory, as well as in terms of software resources, such as drivers, runtimes, utilities, dependencies, etc.), and generate an execution environment to provide such resources. The resource manager may then return identifying information for the execution environment to the scheduler, such that the scheduler may pass a call to execute the task to the execution environment. In some instances, the resource manager may also enable re-utilization of existing execution environments. For example, some tasks, including group-based tasks, may be "pinned," such that an execution environment is pre-generated for the task. Thus, when the resource manager receives a request to generate an execution environment for the task, identifying information for the pre-generated environment may be returned, reducing the time and computing resources required to generate the execution environment. In some instances, execution environments may be re-utilized across tasks, such as when two different tasks require the same or similar resources for execution. In such instances, the resource manager may "clean" the execution environment between execution of different tasks, to ensure the security between the executions. As will be described in more detail below, the resource manager may further enable suspension and resumption of execution environments, such that execution environments of low priority tasks may be suspended to release compute resources to a high priority tasks, and resumed in accordance with a scheduling algorithm.

As described above, in accordance with aspects of the present disclosure, a coordinated environment for execution of on-demand code with reduced memory footprint is provided. More specifically, a coordinator receive individual on-demand code execution requests or tasks from coordinated devices. The coordinator can process the on-demand code execution requests to associate at least a subset of the on-demand code execution with one or more groups sharing executable code. For example, coordinated devices may transmit tasks related to system level task having common executable code. Rather than maintaining the executable code for each received task and scheduling and managing the tasks as described above, the coordinator can maintain master processes (or tasks) associated with the common executable code for a grouping of tasks. Additionally, the coordinator can then maintain individual work-item queues that maintain state information regarding individual tasks. The coordinator can implement the execution of the individual tasks without requiring a separate loading and execution of the on-demand executable code. Accordingly, the coordinator may be implemented on computing devices having more limited computing resources by reducing the memory footprint required to execute the on-demand tasks while maintaining the individual state and configurations for multiple iterations of requested execution of the on-demand tasks.

Although aspects of some embodiments described in the disclosure will focus, for the purpose of illustration, on processing authentication and authorization information and generating processing results, one skilled in the relevant art will appreciate that the examples are illustrative only and are not necessarily intended to be limiting. As will be appreciated by one of skill in the art in light of the present disclosure, the embodiments disclosed herein improves the ability of computing systems, and particularly computing systems with limited localized user interfaces, to be coordinated and managed by an external device.

The foregoing aspects and many of the attendant advantages of this disclosure will become more readily appreciated as the same become better understood by reference to the following description, when taken in conjunction with the accompanying drawings. Various embodiments and aspects of the present application will be described with regard to FIGS. 1-6. Nothing in the present application should be interpreted in a manner that requires any specific combination of embodiments or examples. Additionally, one skilled in the relevant art will appreciate that one or more aspects or embodiments of the present application may be readily combined and can result in additional inventive aspects of the present application.

FIG. 1 is a block diagram of an illustrative operating environment 100, including one or more coordinated environments 110 in which a coordinator 114 may operate to control coordinated devices 112, as well client devices 102 that may interact with the coordinated environments 110 (e.g., to request a change in state of a coordinated device 112), and a service provider environment 120 that may assist in communications with or configuration of the coordinators 114 in various coordinated environments 110.

The coordinated environments 110, client devices, and service provider environment 120 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), MQTT, Constrained Application Protocol (CoAP), and the like. Protocols and components for communicating via the Internet or any of the other aforementioned types of communication networks are well known to those skilled in the art and, thus, are not described in more detail herein. Although all of the components of the network 104 are illustrated in FIG. 1, one or more of the components, such as routers may function as a message processing service.

Each coordinated environment 110 may include a coordinator 114 and any number of coordinated devices 112, in communication via a network of the coordinated environment 110 (which network is not shown in FIG. 1). Because of their association within the coordinated environment 110, the coordinated devices 112 and coordinator 114 within a given environment 110 may be considered "local" to one another, in terms of communications network. For example, the coordinated devices 112 and coordinator 114 within a given environment 110 may be connected via a LAN or other localized communication network.

Each coordinated device 112 can correspond to a computing device configured to communicate with the coordinator 114 to manage functionality of the coordinated device 112. In some instances, coordinated devices 112 can correspond to fully featured computing devices, such as laptops, desktops, standalone media players, etc., with robust localized user interface capabilities. In other instances, coordinated devices 112 can correspond to thin devices or embedded devices associated with another primary function, such as an device embedded within or attached as an accessory to a household appliance or device (such as a refrigerator, washing machine, hot water heater, furnace, door lock, light bulb, electrical outlet, electrical switch, etc.). Such appliances or devices are in some contexts referred to as "smart" devices, IoT devices, or "connected" devices. As such, the coordinated devices 112 may include limited local user interfaces, and be configured for remote management. In some instances, coordinated devices 112 may be stateful, and operate to alter their state in response to instructions (e.g., by turning from "off" to "on," etc.).

As described in more detail below (e.g., with respect to FIG. 2), the coordinator 114 can correspond to a computing device executing instructions to coordinate, manage, or control operation of the coordinated devices 112, without requiring that instructions transmitted to the coordinated devices 112 travel outside the coordinated environments 110 (thus increase the security of such instructions and increasing the speed of their transmission). Similar to the coordinated devices, in some instances, the coordinator 114 can correspond to computing devices, such as laptops, desktops, server computing devices, tablets, etc., with robust localized user interface capabilities. In other instances, coordinated devices 112 can correspond to thin devices or embedded devices associated with another primary function, such as a device embedded within or attached as an accessory to a household appliance or device (such as a refrigerator, washing machine, hot water heater, furnace, door lock, light bulb, electrical outlet, electrical switch, etc.). As described above, in at least some embodiments, the coordinator 114 may be resource constrained or operate in a resource constrained manner. Illustratively, the coordinator 114 can maintain a master process associated with the common executable code for a grouping of tasks to facilitate execution of tasks by the coordinated devices 112 when the coordinator is resource constrained or otherwise is operating in a resource constrained manner.

Specifically, the coordinator 114 can include a processor and memory collectively configured to manage communications between any combination of coordinated devices 112, client devices 102, and devices of the service provider network 120. The coordinator can further be configured to enable executions of tasks, in a manner similar to an on-demand code execution environment 120 of the service provider environment 120. These tasks may implement a variety of user-defined or non-user-defined functionalities, including communicating with coordinated devices 112, client devices 102, and devices of the service provider network 120. Illustrative examples of how a coordinator 114 can schedule the execution of tasks in the on-demand execution environment are disclosed in the '696 application, which has been incorporated by reference herein. As such, the coordinator 114 can be configured to allow for manual, automatic, or semi-automatic control of coordinated devices 112. For example, the coordinator 114 may enable a client device 102 to transmit a request to change the state of a coordinated device 112, and cause such a change in state to occur. As a further example, the coordinator 114 may enable a user to specify a criterion under which a state of a coordinated device 112 should be changed, and then automatically operate to change the state of the coordinated device 112 when the criterion is satisfied. As will be discussed below, many functions of the coordinator 114 may be established via tasks, enabling rapid alteration of these functions as desired by a user.

Client devices 102 may include a variety of computing devices enabling a user to communicate with the coordinated environments 110, the service provider environment 120, or both. In general, the client devices 102 can be any computing device such as a desktop, laptop or tablet computer, personal computer, wearable computer, server, personal digital assistant (PDA), hybrid PDA/mobile phone, mobile phone, electronic book reader, set top box, voice command device, camera, digital media player, and the like. The service provider environment 120 may provide the client devices 102 with one or more user interfaces, command-line interfaces (CLI), application programming interfaces (API), and/or other programmatic interfaces for interacting with the service provider environment 120, such as to submit a configuration for a coordinator 114, and control deployment of that configuration, to submit code corresponding to a task to be executed on the coordinator 114 or an on-demand code execution environment 140 of the service provider environment 120, to view logging or monitoring information related to coordinators 114, etc. Similarly, the coordinator 114 may provide the client devices 102 with one or more user interfaces, command-line interfaces (CLI), application programming interfaces (API), and/or other programmatic interfaces for interacting with the coordinator 114, such as to read a state of a coordinated device 112, request a change in state of a coordinated device 112, request that the coordinator 114 cause execution of a task, etc. Although one or more embodiments may be described herein as using a user interface, it should be appreciated that such embodiments may, additionally or alternatively, use any CLIs, APIs, or other programmatic interfaces.

The service provider environment 120 can include a number of elements to enable configuration of, management of, and communications with coordinators 114. Specifically, the service provider environment 120 includes a management and deployment service 130 to enable registration of coordinators 114 with the service provider environment 120 and configuration of such coordinators 114 and an on-demand code execution environment 140 providing on-demand, dynamic execution of tasks, as well as deployment and provisioning of tasks on coordinators 114. The service provider environment 120 can also include additional components or services not illustrated in FIG. 1.

As shown in FIG. 1, the management and deployment service 130 includes a client and data interface 132 and a configuration data store 134 that may operate collectively to enable registration of a coordinator 114 with the management and deployment service 130, generation of configurations for the coordinator 114, and transmission of configuration data to the coordinator 114. Illustratively, the client and data interface 132 may provide one or more user interfaces (e.g., APIs, CLIs, GUIs, etc.) through which a user, via a client device 102, may generate or submit a configuration of a coordinator 114 for storage in the configuration data store 134. The client and data interface 132 may further provide one or more interfaces through which a coordinator 114 may obtain the configuration, such that the coordinator 114 is reconfigured according to the obtained configuration. The configuration data store 134 can correspond to any persistent or substantially persistent data store, such as a hard drive (HDD), a solid state drive (SDD), network attached storage (NAS), a tape drive, or any combination thereof.

The on-demand code execution environment 140 can include a number of devices providing on-demand execution of tasks (e.g., portable code segments). Specifically, the on-demand code execution environment 140 can include a frontend 142, through which users, via client device 102, may submit tasks to the on-demand code execution environment 140 and call for execution of tasks on the on-demand code execution environment 140. Such tasks may be stored, for example, in a task data store 154, which can correspond to any persistent or substantially persistent data store, such as a hard drive (HDD), a solid state drive (SDD), network attached storage (NAS), a tape drive, or any combination thereof. While not shown in FIG. 1, the on-demand code execution system 140 can include a variety of additional components to enable execution of tasks, such as a number of execution environments (e.g., containers or virtual machines executing on physical host devices of the on-demand code execution environment 140), a worker manager to manage such execution environments, and a warming pool manager to assist in making execution environments available to the worker manager on a rapid basis (e.g., under 10 ms). Further details regarding the on-demand code execution environment can be found within the '556 patent, incorporated by reference above.

As noted above, tasks may be utilized both at the on-demand code execution environment 140 at coordinators 114. As noted above, tasks correspond to individual collections of user code (e.g., to achieve a specific function). References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. Specific executions of that code are referred to herein as "task executions" or simply "executions." Tasks may be written, by way of non-limiting example, in JavaScript (e.g., node.js), Java, Python, and/or Ruby (and/or another programming language). As further noted in the present application, group-based tasks correspond to executable code associated with common executable code for a grouping of tasks and that may be executed by the coordinators 114 in lieu of individual tasks. Such execution reduces the memory constraints of the coordinator by reducing the storage of the individual tasks for execution.

Tasks may be "triggered" for execution on the on-demand code execution system 140 or a coordinator 114 in a variety of manners. In one embodiment, a client device 102 or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of a coordinator 114, a network-accessible storage service, or the task data store 144) prior to the request being received by the coordinator 114 or the on-demand code execution system 140. A request interface of the coordinator 114 or the on-demand code execution system 140 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to a coordinator 114 or the on-demand code execution system 140 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the coordinator 114 or the on-demand code execution system 140 (e.g., standard routines), or provided by third parties.

In some embodiments, such resource-level constraints (e.g., how much memory is to be allocated for executing a particular user code) are specified for the particular task, and may not vary over each execution of the task. In such cases, the coordinator 114 or the on-demand code execution system 140 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 140 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the coordinator 114 or the on-demand code execution system 140 may inspect the call and look for the flag or the header, and if it is present, the coordinator 114 or the on-demand code execution system 140 may modify the behavior (e.g., logging facilities) of the execution environment in which the task is executed, and cause the output data to be provided back to the user. In some embodiments, the behavior/mode indicators are added to the call by the user interface provided to the user by the coordinator 114 or the on-demand code execution system 140. Other features such as source code profiling, remote debugging, etc. may also be enabled or disabled based on the indication provided in a call.

The service provider environment 120 is depicted in FIG. 1 as operating in a distributed computing environment including several computer systems that are interconnected using one or more computer networks (not shown in FIG. 1). The service provider environment 120 could also operate within a computing environment having a fewer or greater number of devices than are illustrated in FIG. 1. Thus, the depiction of the service provider environment 120 in FIG. 1 should be taken as illustrative and not limiting to the present disclosure. For example, the service provider environment 120 or various constituents thereof could implement various Web services components, hosted or "cloud" computing environments, and/or peer to peer network configurations to implement at least a portion of the processes described herein.

Further, the service provider environment 120 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

Figure 2:
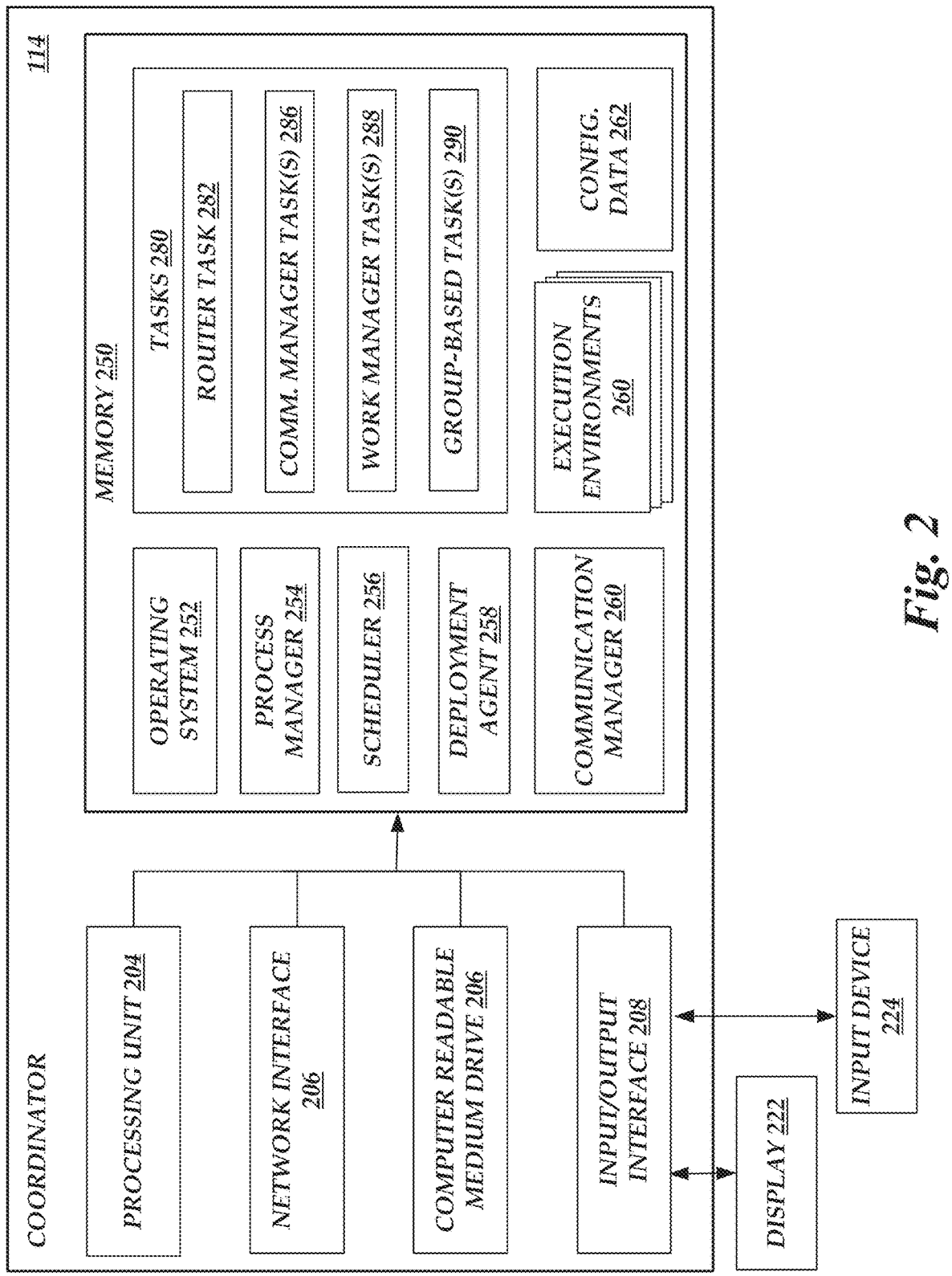
FIG. 2 depicts a general architecture of a computing device providing a coordinator of FIG. 1.

FIG. 2 depicts a general architecture of a computing system (referenced to generally as a coordinator 114) that manages coordinated devices 112 within a given coordinated environment 110. Reference to the coordinator 114 can include the functions executed by the software modules or tasks or the device(s). The general architecture of the coordinator 114 depicted in FIG. 2 includes an arrangement of computer hardware and software modules that may be used to implement aspects of the present disclosure. The hardware modules may be implemented with physical electronic devices, as discussed in greater detail below. The coordinator 114 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1.

As illustrated, the coordinator 114 includes a processing unit 204, a network interface 206, a computer readable medium drive 207, and an input/output device interface 208, all of which may communicate with one another by way of a communication bus. The network interface 206 may provide connectivity to one or more networks or computing systems. The processing unit 204 may thus receive information and instructions from other computing systems or services via the network 104. The processing unit 204 may also communicate to and from memory 250 and further provide output information for an optional display (not shown) via the input/output device interface 208. The input/output device interface 208 may also accept input from an optional input device (not shown).

The memory 250 may contain computer program instructions (grouped as modules in some embodiments) that the processing unit 204 executes in order to implement one or more aspects of the present disclosure. The memory 250 generally includes random access memory (RAM), read only memory (ROM) and/or other persistent, auxiliary or non-transitory computer readable media. The memory 250 may store an operating system 252 that provides computer program instructions for use by the processing unit 204 in the general administration and operation of the coordinator 114. The memory 250 may further include computer program instructions and other information for implementing aspects of the present disclosure. For example, in one embodiment, the memory 250 includes a process manager 254, a scheduler 256, a deployment agent 258, and a communication manager 260.

The scheduler 256 and deployment agent 258 may be executed by the processing unit 204 to select tasks for execution by the processing unit 204, and to manage such task executions. Specifically, the scheduler 256 may include instructions to select tasks for execution at given points in time and to suspend execution of tasks (e.g., under instances of constrained resources at the coordinator 114). The deployment agent 258 may include instructions to select an appropriate execution environment 270 in which to execute a task, to provision that execution environment 270 with appropriate access to resources needed during the task execution, and to cause execution of the task within the execution environment 270. As applied to the present application, the scheduler may execution group-based tasks in the execution environment in lieu of received individual task execution requests from coordinated devices 112.

An execution environment 270, as used herein, refers to a logical portion of memory 250 in which to execute a task. In one embodiment, execution environments 270 are programmatically separated, such that execution of code in a first execution environment 270 is prohibited from modifying memory associated with another execution environment 270. Illustratively, an execution environment 270 may correspond to a "container," operating-system-level virtualization environment, or "sand box" environment, such as a "chroot jail" or a Python virtual environment "virtualenv." In other instances, an execution environment 270 may correspond to a virtual machine environment (e.g., a JAVA virtual machine, a virtualized hardware device with distinct operating system, etc.). In still other instances, an execution environment 270 may be a memory space allocated to an execution of a task, without necessarily utilizing virtualization.

Communications between tasks executing on the coordinator, as well as between the coordinator 114 and other devices (e.g., client devices 102 and coordinated devices 112) may be facilitated by the communication manager 260. Specifically, the communication manager 260 may be configured to obtain messages directed to the coordinator 114 and forward the message to the appropriate destination. For example, the communication manager 260 may route messages between any combination of tasks, coordinated devices 112, client devices 102, and devices of the service provider execution environment 120.

Tasks executed by the coordinator 114 are shown as logically grouped within the tasks memory space 280, which may correspond to a logical unit of memory 250 configured to store the code corresponding to each task. As shown in FIG. 2, the tasks memory space 280 can include a number of tasks executable by the processing unit 204 to implement functionalities of the coordinator 114, including a router task 282, one or more communication manager tasks 286, a shadow service task 288, and one or more client-provided tasks 290.

The router task 282 may correspond to a portion of code executable to assist in the routing of messages within, to, and from the coordinator. In one embodiment, the router task 282 implements a "routing table" to determine appropriate destinations for a message. For example, the communication manager 260 may forward messages obtained at the coordinator 114 (e.g., due to generation by a task execution or reception at the input/output interface 208) to the router task 282, which may utilize the routing table to determine that messages addressed to a certain identifier should be routed to a given task, a given client device 102, or a given coordinated device 102. The routing table may further indicate that a message addressed to an identifier should be transmitted to the service provider environment 120 (e.g., to the management and deployment service 130 or the on-demand code execution system 140). In one embodiment, the routing table may utilize "topics" as identifiers, such that messages associated with a particular topic are routed according to a routing specified for that topic. The routing table may further include information for how to route messages based on a source of those messages. For example, a message addressed to a given topic may be routed differently, based on whether the message is received from a first task, a second task, a first coordinated device 112, etc. By utilization of a routing table, router task 282 can enable messages to be redirected, without a change in the operation of a sender of such a message (e.g., without rewriting code for a task that generated the message, without modifying the software of a coordinated device 112 that generated the message, etc.).

The communication manager tasks 286 may enable communications between the coordinator 114 and a number of different external devices (e.g., coordinated devices 102) according to a protocol of such communications. For example, a first communication manager task 286 may be configured to manage communications using a BLUETOOTH™ protocol, a second communication manager may be configured to manage communications using an HTTP protocol, etc. In some instances, multiple communication manager tasks 286 may work collectively to implement communications. For example, a first communication manager task 286 may enable communications via the TCP protocol, while a second communication manager task 286 may enable communications via the MQTT protocol (which utilizes the TCP protocol and thus may utilize a first communication manager task 286). Because different communication manager tasks 286 can vary the ability of the coordinator 114 to communicate via different protocols, and because the tasks of the coordinator 114 may be altered via reconfiguration of the coordinator 114, the coordinator 114 can be rapidly reconfigured to utilize a variety of different communication protocols.

The work manager task 288 can facilitate management and interaction of the execution of shared on-demand code by the coordinator 114. Illustratively, work manager task 288 can associate incoming tasks with group-based, shared on-demand code, generally referred to as group-based on-demand code maintain the work queues for keeping state information about tasks associated with executed of the group-based on-demand code.

In addition to the tasks described above (each of which may illustratively be provided by an entity associated with the service provider environment 120), the tasks memory space 280 may include any number of group-based on-demand code or group-based tasks 290, which may correspond to executable code for deployment to a coordinator 114. As such, functionalities provided by the client-provided tasks 290 may vary according to the desires of a submitting user. In some instances, the client-provided tasks 290 may be written in a coding language for which the memory 250 includes a language runtime. For example, where the coordinator 114 supports language such as node.js, Go, JAVA, and Python, the client-provided tasks 290 may include executable code written in any of those languages. As described above, the group-based on-demand code is associated with organizational criteria, such as function, author, accessed resource, results, and the like. In some embodiments, the tasks memory space 280 can include individual tasks that are not included as group-based on-demand code or have been explicitly excluded as group-based on-demand code.

In addition, the memory 250 includes a configuration data portion 272, representing a logical portion of the memory 250 in which configuration data of the coordinator 114 is stored. The configuration data may include, for example, a current deployment version of the coordinator 114, data stored by the tasks of the task memory space 280, or other data used in the operation of the coordinator 114.

To enable configuration (and reconfiguration) of the coordinator 114, the memory 250 further includes a deployment agent 258. The deployment agent 258 can correspond to code executable to register a coordinator with the service provider environment 120, to determine a desired configuration of the coordinator 114, and in instances where a current configuration of the coordinator 114 does not match a desired configuration, to obtain configuration data for the coordinator 114 and modify the memory 250 to implement the desired configuration.

Figure 3A:
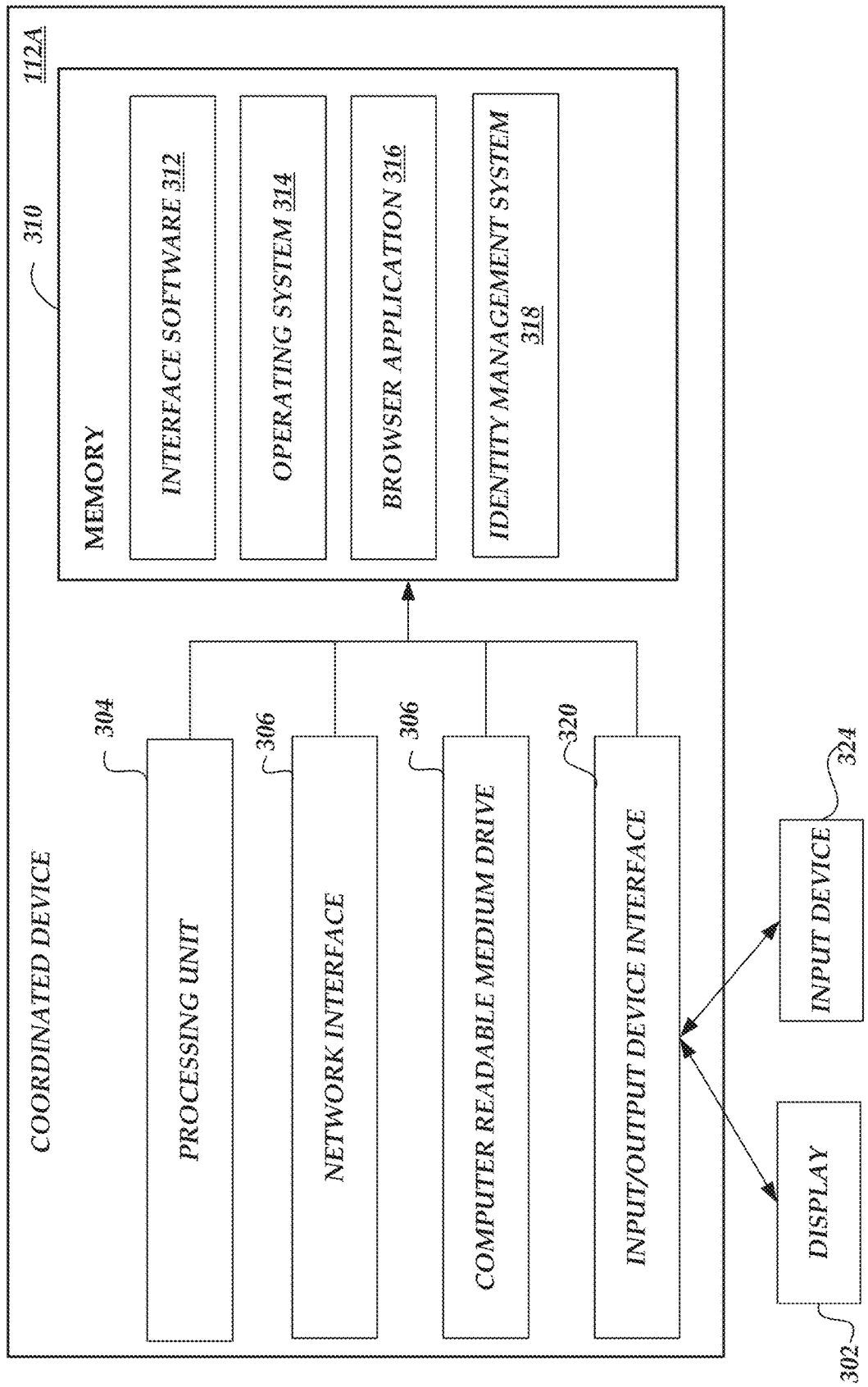

FIG. 3A depicts one embodiment of an architecture of an illustrative coordinated device 112A in accordance with the present application. The general architecture of the coordinated device 112A depicted in FIG. 3A includes an arrangement of computer hardware and software components that may be used to implement aspects of the present disclosure. As illustrated, the coordinated device 112A includes a processing unit 304, a network interface 306, a computer readable medium drive 307, an input/output device interface 320, an optional display 302, and an input device 324, all of which may communicate with one another by way of a communication bus. Illustratively, the coordinated device 112A may have more limited functionality and components, such as inputs or outputs, as embedded devices.

The network interface 306 may provide connectivity to one or more networks or computing systems, such as the network 104 of FIG. 1. The processing unit 304 may thus receive information and instructions from other computing systems or services via a network. The processing unit 304 may also communicate to and from memory 310 and further provide output information for an optional display 302 via the input/output device interface 320. The input/output device interface 320 may also accept input from the optional input device 324, such as a keyboard, mouse, digital pen, etc. In some embodiments, the coordinated device 112A may include more (or fewer) components than those shown in FIG. 3A. For example, some embodiments of the coordinated device 112 may omit the display 302 and input device 324, while providing input/output capabilities through one or more alternative communication channel (e.g., via the network interface 306). Additionally, the coordinated device 112A may omit the input and output interface 320 altogether as well.

The memory 310 may include computer program instructions that the processing unit 204 executes in order to implement one or more embodiments. The memory 310 generally includes RAM, ROM or other persistent or non-transitory memory. The memory 310 may store an operating system 314 that provides computer program instructions for use by the processing unit 304 in the general administration and operation of the coordinated device 112A. The memory 310 may further include computer program instructions and other information for implementing aspects of the present disclosure. For example, in one embodiment, the memory 310 includes a browser application 316 for accessing content. Illustratively, the browser application 316 may encompass a full software browser application, portions of a browser application or simply be a software application (or executable instructions) that provide for data connectivity.

FIG. 3B depicts one embodiment of an alternative architecture of an illustrative coordinated device 112B in accordance with the present application. The general architecture of the coordinated device 112B depicted in FIG. 3B includes an arrangement of computer hardware and software components that may be used to implement aspects of the present disclosure. However, coordinated device 112B may be associated with a reduced of components that may limit the computing functionality and operation of the coordinated device 112B. As illustrated, the coordinated device 112B includes a processing unit 350 and a network interface 352 that communicate with a communication bus. Unlike coordinated device 112BA of FIG. 3A, the coordinated device 112B may not have a computer readable medium drive, an input/output device interface, an optional display, or an input device.

The network interface 352 may provide connectivity to one or more networks or computing systems, such as the network 104 of FIG. 1. The processing unit 350 may thus receive information and instructions from other computing systems or services via a network. The memory 354 may include computer program instructions that the processing unit 350 executes in order to implement one or more embodiments. The memory 354 generally includes RAM, ROM or other persistent or non-transitory memory. In this embodiment, the memory 354 may store necessarily store a full operating system that provides computer program instructions for use by the processing unit 350 in the general administration and operation of the coordinated device 112B. Rather, in one embodiment, the memory 354 includes an interface software component 356 for accessing receiving and processing instructions.

Figure 4:
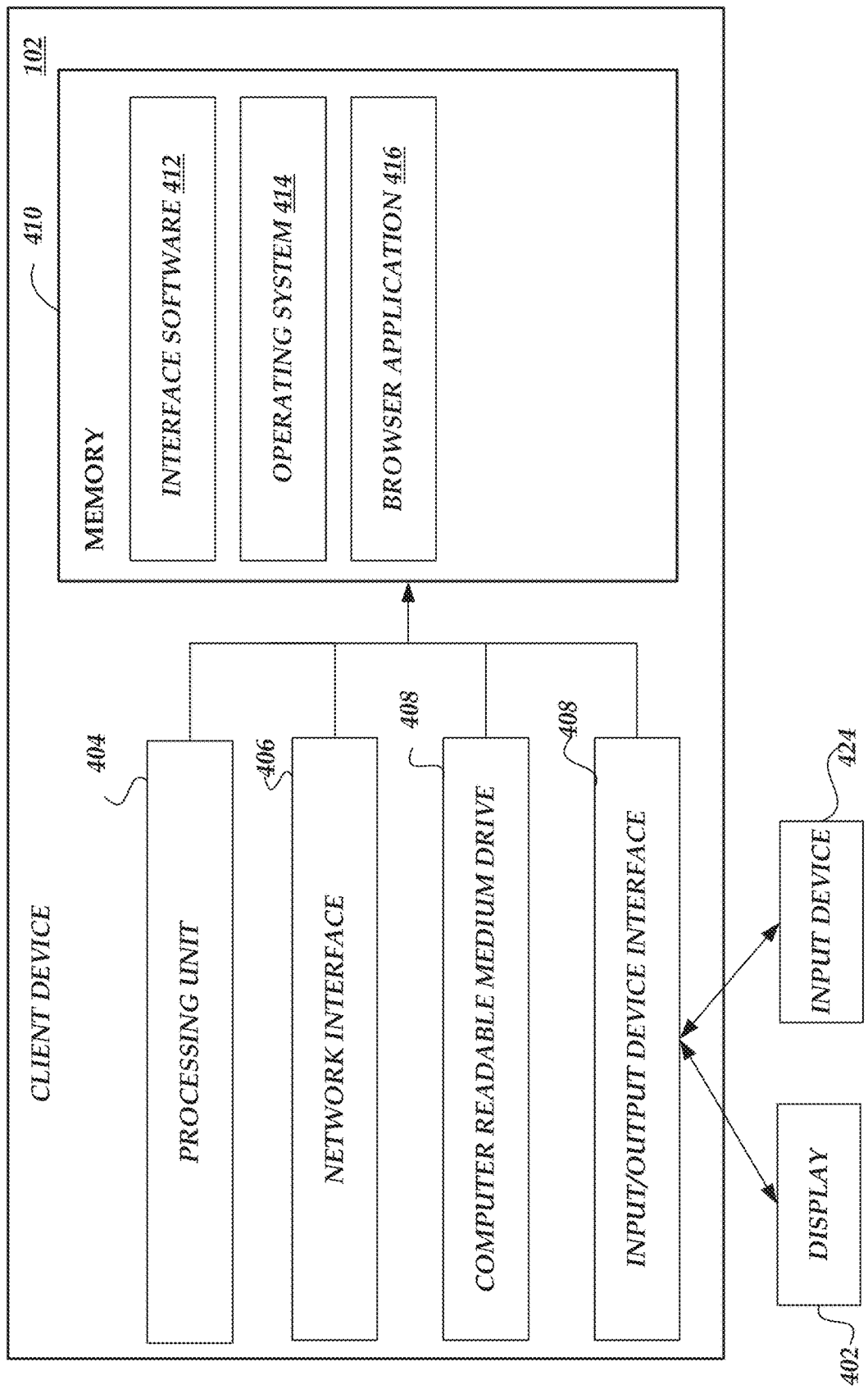
FIG. 4 depicts a general architecture of client device that may be utilized to generate and submit configuration information related to managing configuration of authentication and authorization services in edge devices.

FIG. 4 depicts one embodiment of an architecture of an illustrative client device 102 in accordance with the present application. The general architecture of the client device 102 depicted in FIG. 4 includes an arrangement of computer hardware and software components that may be used to implement aspects of the present disclosure. As illustrated, the client device 102 includes a processing unit 404, a network interface 406, a computer readable medium drive 407, an input/output device interface 420, an optional display 402, and an input device 424, all of which may communicate with one another by way of a communication bus.

The network interface 406 may provide connectivity to one or more networks or computing systems, such as the network 104 of FIG. 1. The processing unit 404 may thus receive information and instructions from other computing systems or services via a network. The processing unit 404 may also communicate to and from memory 410 and further provide output information for an optional display 402 via the input/output device interface 420. The input/output device interface 420 may also accept input from the optional input device 424, such as a keyboard, mouse, digital pen, etc. In some embodiments, the client device 102 may include more (or fewer) components than those shown in FIG. 4. For example, some embodiments of the coordinated device 112 may omit the display 402 and input device 424, while providing input/output capabilities through one or more alternative communication channel (e.g., via the network interface 406). Additionally, the client device 102 may omit the input and output interface 420 altogether as well.

The memory 410 may include computer program instructions that the processing unit 204 executes in order to implement one or more embodiments. The memory 410 generally includes RAM, ROM or other persistent or non-transitory memory. The memory 410 may store an operating system 414 that provides computer program instructions for use by the processing unit 404 in the general administration and operation of the client device 102. The memory 410 may further include computer program instructions and other information for implementing aspects of the present disclosure. For example, in one embodiment, the memory 410 includes a browser application 416 for accessing content. Illustratively, the browser application 416 may encompass a full software browser application, portions of a browser application or simply be a software application (or executable instructions) that provide for data connectivity. For purposes of the present application, client 102 can facilitate the configuration of the group-based on-demand code or selection criteria for the group-based on-demand code.

Figure 5A:
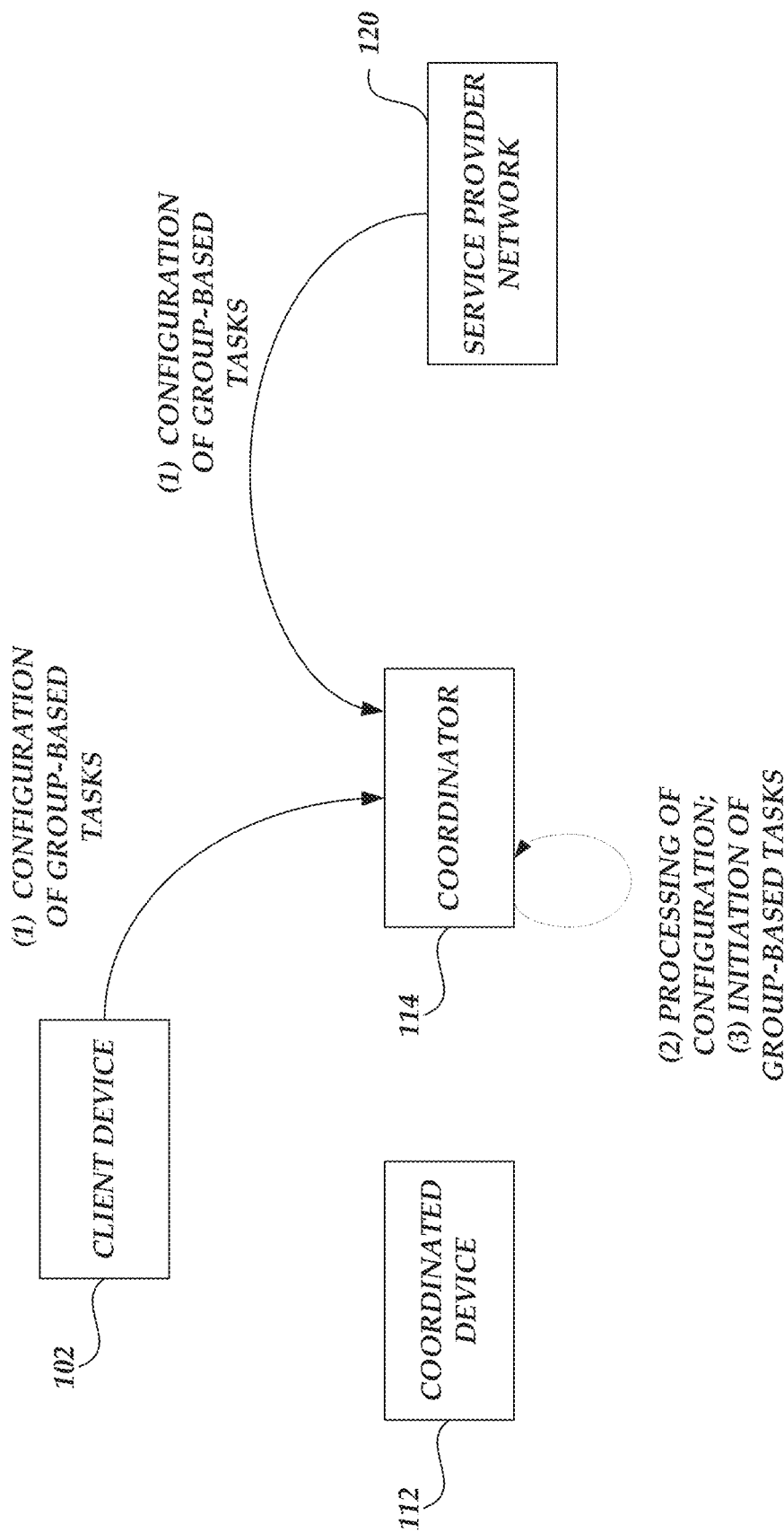
FIGS. 5A-5B are block diagrams of the illustrative environment of FIG. 1 depicting illustrative interaction for configuration and execution of group-based tasks.
Figure 5B:
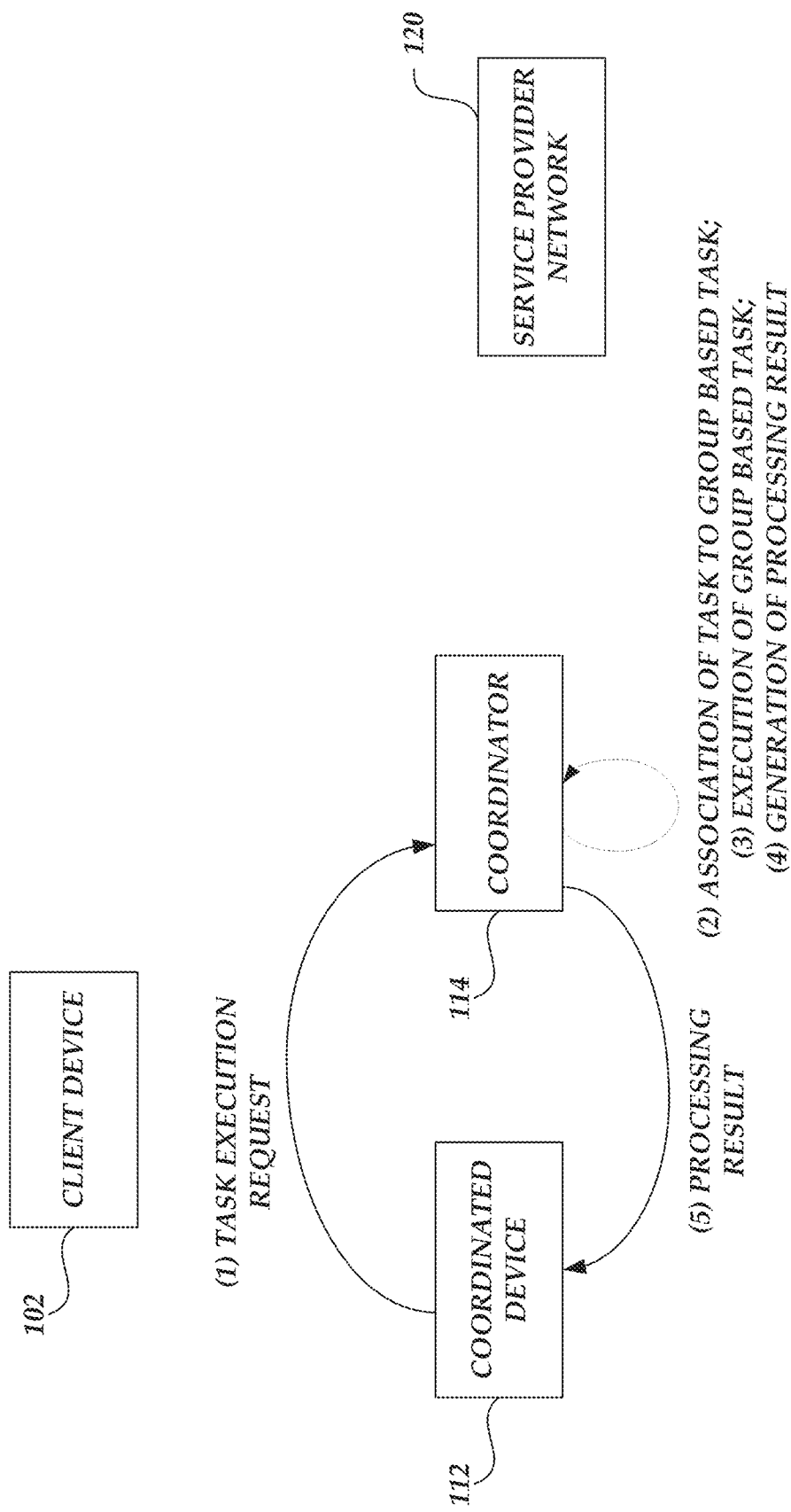

Turning now to FIGS. 5A-5B, illustrative interactions between the components of the operating environment 100 to process task execution requests utilizing group based on demand code or group based on demand tasks will be described. More specifically, FIGS. 5A-5B will be described with regard to interactions between coordinated devices 112, the coordinator 114, the client device 102 and the service provider environment 120. As previously indicated, the coordinator 114 may be configured in one embodiment to execute tasks related to receiving and maintaining authorization and authentication information and processing authentication and authorization requests from coordinated devices 112 to generate processing results. However, reference to interactions should not be limited to any particular device or combination of devices, even if used for illustrative purposes. Additionally, in some embodiments, one or more of the client devices 102 or service provider environment 120 may be omitted.

With reference to FIG. 5A, the initial configuration of a coordinator 114 will be described. Illustratively, the service provider environment 120 or client device can facilitate the configuration and coordination of group-based on-demand code. Illustratively, the work component of the coordinator 114 configure the set of group-based on-demand code. At (1), the coordinator 114 receives configuration of one or more group-based on-demand code. In one aspect, the configuration can include the identification of specific tasks that are considered group-based on-demand code, such as system level tasks. In another aspect, the configuration of the tasks are matching criteria for allowing the coordinate device to determine which task requests correspond to group-based on-demand code. In other aspects, the configuration can include other search criteria or processing instructions to allow the coordinate device to either assess tasks that can be group-based on-demand code or to dynamically process tasks to determine whether a task corresponds to a group based task.

At (2), the coordinator 114 processes the configuration information. In one aspect, the coordinator 114 can parse and store the various configuration information and criteria. In another aspect, the coordinator 114 can request and receive the tasks or on-demand code that form the group-based on-demand code. At (3), the coordinator 114 initiates the execution of the group-based on-demand code. As described above, the execution of group-based on-demand includes the initiation of a manager component for registering new implementation of the group-based on-demand code and for keeping state information regarding each iteration of the group-based on-demand code. More specifically, the manager component can maintain instances of a work node or worker manager that includes state information required by or generated by the execution of the group-based task for each iteration of the execution of the group-based task. The work node or worker manager allows the manager component of the coordinator 114 to manage multiple executions of the group-based task based on requests from one or more coordinated devices 112. Additionally, in some embodiments, the manager component can also manage the multiple executions of the group-based on-demand code and make modifications in the event that one execution of the group-based on-demand code can affect other executions. For example, if execution of an instance of the group-based on-demand code does not progress or creates an error, the manager component can terminate the task so as to not affect other executions of the group-based on-demand code. After the configuration, the coordinated device is prepared to begin execution.

With reference to FIG. 5B, a processing of tasks will be described. At (1), one or more coordinated devices 112 transmit a request for execution at the coordinator 114. Illustratively, the coordinate device 112 transmits the request to the coordinator 114 utilizing a communication protocol. For example, the coordinate device may utilize the MQTT protocol to identify the request and provide information that can be utilized to evaluate the request, such as provided login, password, biometric information, etc. The interaction between the coordinated devices 112 and coordinator 114 may entail a number of communications. Depending on the type of request, the information included in the request can include identifiers, previously issued tokens, security information and the like.

At (2), the coordinator 114 determines whether the request for the execution of a task corresponds to a group-based tasks. If so, the coordinator can associate the request with a group-based on-demand code. In one embodiment, the coordinator 114 may look for various identifiers included in the request or task identifiers. In another embodiment, the coordinator 114 can process the request, such as by applying criteria, to determine whether the request corresponds to group-based on-demand code.

At (3), if the coordinator determines that the request corresponds to group-based on-demand code, the coordinator 114 begins an iteration of the execution of the group-based on-demand code. As described above, the work manager can generate a work queue that tracks status or states of multiple execution of the group-based on-demand code. Each instance of the execution of the task can be represented as a separate worker task or component that manages the inputs provided in the request, keeps the state and generates the output. Additionally, in some embodiments, the handler for the group-based on-demand code functions as the master handler that can interact with local handlers for each respective requested task, process the execution of the group-based on-demand code, and provide the processing result to the individual handlers. As described above, by utilizing the group-based on-demand code, the coordinator 114 can improve the processing of tasks submitted by the coordinated devices 112 in situations in which the memory resources of the coordinator 114 are constrained or are operating in a constrained manner. Alternatively, the coordinator 114 can also increase the number of tasks that can be processed for execution by having multiple executions of the group-based on-demand code and keeping track of state.

At (4), the coordinator 114 generates the processing result and transmits the processing result to the requesting client device 102.

Figure 6:
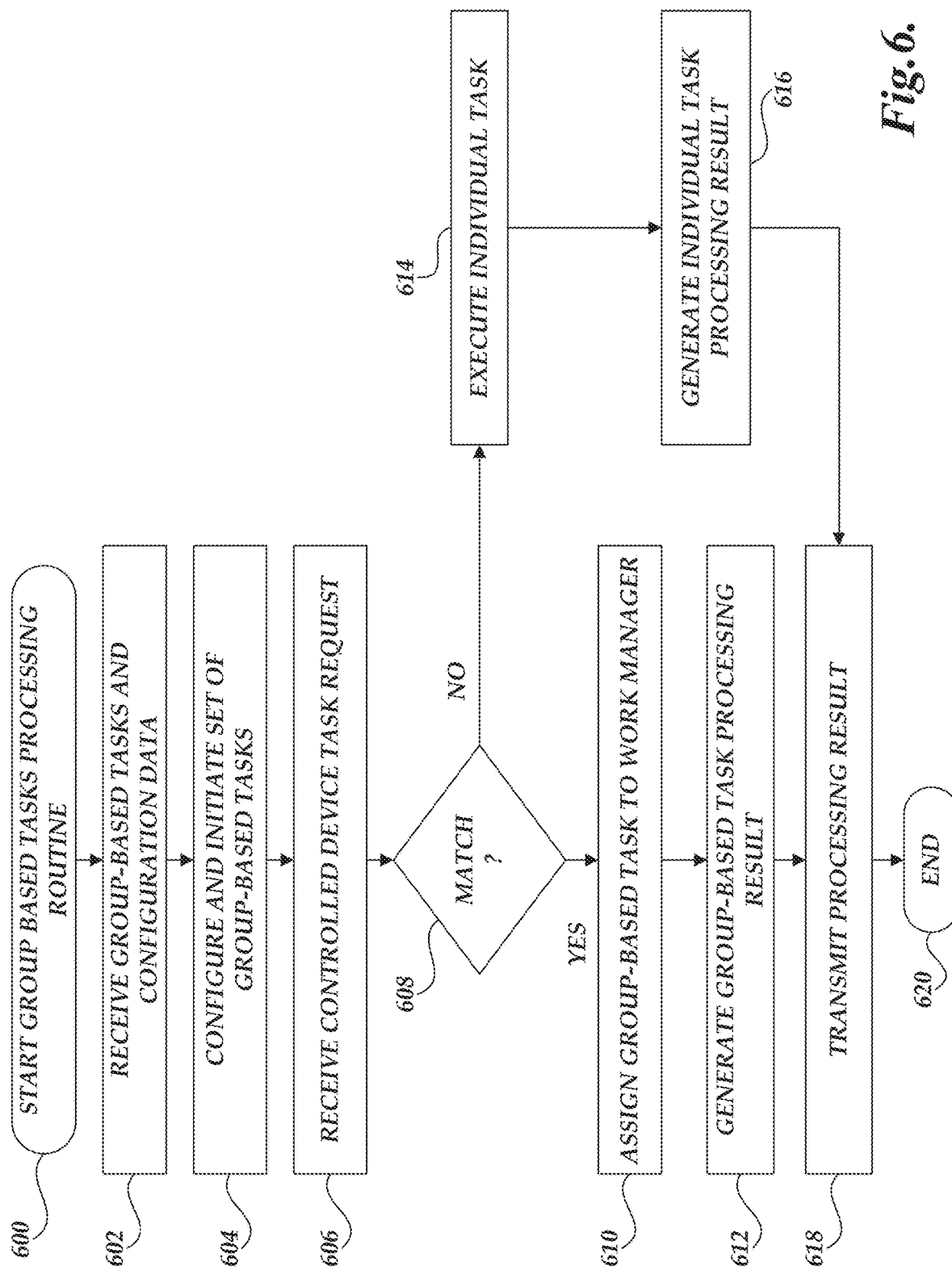
FIG. 6 is flow diagram illustrative of routine for receiving and processing of group-based tasks.

Turning now to FIG. 6, a routine 600 for processing tasks for execution will be described. Routine 600 will be illustratively described with regard to a coordinator 114. As previously indicated, the coordinator 114 may be configured in one embodiment to execute tasks related to one or more group-based on-demand code. However, reference to interactions should not be limited to any particular device or combination of devices, even if used for illustrative purposes.

At block 602, the coordinator 114 receives configuration of one or more group-based on-demand code. In one aspect, the configuration can include the identification of specific tasks that are considered group-based on-demand code, such as system level tasks. The identification of the group-based on-demand code can include receipt of the group-based tasks that will be executed. In another embodiment, the configuration can include information that can be used to identify a location or source of the group-based tasks, such as a library of pre-stored task information, one or more coordinated devices, or the service provider network 120. In another aspect, the configuration of the tasks are matching criteria for allowing the coordinate device to determine which task requests correspond to group-based on-demand code. The matching criteria can include identifiers that will be utilized in the transmission of task execution request, identifiers of the contents of a tasks (e.g., a checksum or hash), author or distributors of group-based tasks and the like. In other aspects, the configuration can include other search criteria or processing instructions to allow the coordinate device to either assess tasks that can be group-based on-demand code or to dynamically process tasks to determine whether a task corresponds to a group based task.

At block 604, the coordinated device processes the configuration information to configure and instantiate one or more group-based tasks. In one aspect, the coordinator device 114 can parse and store the various configuration information and criteria. In another aspect, the coordinator device 114 can request and receive the tasks or on-demand code that form the group-based on-demand code. Additionally, the coordinator 114 initiates the execution of the group-based on-demand code. As described above, the execution of group-based on-demand includes the initiation of a manager component for registering new implementation of the group-based on-demand code and for keeping state information regarding each iteration of the group-based on-demand code. More specifically, the manager component can maintain instances of a work node or worker manager that includes state information required by or generated by the execution of the group-based task for each iteration of the execution of the group-based task. The work node or worker manager allows the manager component of the coordinator 114 to manage multiple executions of the group-based task based on requests from one or more coordinated devices 112. As will be described below, in some embodiments, the manager component can also manage such multiple executions of the group-based on-demand code and make modifications in the event that one execution of the group-based on-demand code can affect other executions. For example, if execution of an instance of the group-based on-demand code does not progress or creates an error, the manager component can terminate the task so as to not affect other executions of the group-based on-demand code. In another example, the manager component can cause a modification of the task such as changing an inputted parameter, processing an output or substituting another group-based task. After the configuration, the coordinated device is prepared to begin execution of the group-based tasks.

At block 606, the coordinator 114 receives a request for execution at the coordinator 114. Illustratively, the coordinated device 112 transmits the request to the coordinator 114 utilizing a communication protocol. For example, the coordinate device may utilize the MQTT protocol to identify the request and provide information that can be utilized to evaluate the request, such as provided login, password, biometric information, etc. The interaction between the coordinated devices 112 and coordinator 114 may entail a number of communications. Depending on the type of request, the information included in the request can include identifiers, previously issued tokens, security information and the like.

At decision block 608, the coordinator 114 determines whether the request for the execution of a task corresponds to a group-based tasks. In one embodiment, the coordinator 114 may look for various identifiers included in the request or task identifiers. In another embodiment, the coordinator 114 can process the request, such as by applying criteria, to determine whether the request corresponds to group-based on-demand code. At block 610, if the coordinator determines that the request corresponds to group-based on-demand code, the coordinator 114 begins an iteration of the execution of the group-based on-demand code. As described above, the work manager can generate a work queue that tracks status or states of multiple execution of the group-based on-demand code. Each instance of the execution of the task can be represented as a separate worker task or component that manages the inputs provided in the request, keeps the state and generates the output. Additionally, in some embodiments, the handler for the group-based on-demand code functions as the master handler that can interact with local handlers for each respective requested task, process the execution of the group-based on-demand code, and provide the processing result to the individual handlers. By having multiple executions of the group-based on-demand code, however, the memory resources of the execution of the plurality of tasks executed by the coordinated are less than if the coordinator 114 executed all the tasks separately. At block 612, the coordinator 114 generates the processing result and transmits the processing result to the requesting client device 102.

Alternatively, at decision block 608, if the coordinator determines that the request does not corresponds to group-based on-demand code, the coordinator 114 begins an iteration of the execution of the individual task at block 614. At block 616, the coordinator 114 generates the processing result and transmits the processing result to the requesting client device 102.

At block 618, the coordinator 114 transmits the processing result and routine 600 terminates at block 620.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing access to computing devices comprising:
   a first computing device having a processor and a memory, the first computing device corresponding to a coordinated device, wherein the coordinated device transmits requests to execute group-based tasks to a coordinator service; and,
   a coordinator service implemented on a second computing device having a processor and a memory, wherein the coordinator service is configured to:
      receive configuration information for a set of group-based tasks, wherein each of the set of group-based tasks corresponds to respective on-demand code, and wherein the set of group-based tasks corresponds to a group of coordinated devices in communication with the coordinator service;
      cause instantiation of on-demand code corresponding to at least one of the group-based tasks;
      receive a request to execute the at least one group-based task from the coordinated device;
      associate, based at least in part on the configuration information, the request to execute the at least one group-based task with the instantiated on-demand code;
      cause execution of the instantiated on-demand code;
      generate a processing result corresponding to the execution of the instantiated on-demand code; and
      transmit the processing result to the coordinated device.

2. The system as recited in claim 1, wherein the coordinator service associates the request to the instantiated on-demand code based on organizational criteria.

3. The system as recited in claim 1, wherein the coordinator service is further configured to maintain a work queue regarding state information for the execution of the instantiated on-demand code.

4. The system as recited in claim 1, wherein the instantiated on-demand code corresponds to one or more operating system level tasks.

5. A method for managing the execution of on-demand code in a coordinated environment comprising:
   receiving individual requests from one or more coordinated devices to execute a group-based task of a set of group-based tasks, wherein execution of individual group-based tasks corresponds to execution of respective on-demand code in the coordinated environment, and wherein the set of group-based tasks corresponds to the one or more coordinated devices;
   associating the individual requests to execute the group-based tasks with respective instantiated on-demand code based at least in part on configuration information for the set of group-based tasks;
   causing execution of the associated instantiated on-demand code in response to each of the individual requests;
   generating individual processing results corresponding to each execution of instantiated on-demand code; and
   transmitting the processing result for each of the individual requests to the coordinated device from which the request was received.

6. The method as recited in claim 5 further comprising receiving configuration information for the group-based tasks, the configuration information associating each group-based task with corresponding on-demand code and with the one or more coordinated devices.

7. The method as recited in claim 6 further comprising causing instantiation of on-demand code associated with at least one of the group-based tasks.

8. The method as recited in claim 5, wherein associating the individual requests to execute the group-based tasks with on-demand code includes associating individual requests with on-demand code based on organizational criteria.

9. The method as recited in claim 5 further comprising managing the execution of the on-demand code.

10. The method as recited in claim 9, wherein managing the execution of the on-demand code includes maintaining a work queue regarding state information for the execution of the instantiated on-demand code.

11. The method as recited in claim 9, wherein managing the execution of the on-demand code includes causing modification of at least one execution of the on-demand code.

12. The method as recited in claim 5 further comprising:
   receiving a request from the one or more coordinated devices to execute on-demand code that is not associated with a group-based task;
   causing execution of the on-demand code not associated with a group-based task;
   generating a processing result corresponding to the execution of on-demand code not associated with a group-based task.

13. A method for managing execution of tasks in a coordinated environment comprising:
   obtaining individual requests to execute group-based tasks, wherein execution of individual group-based tasks corresponds to execution of respective on-demand code in the coordinated environment, and wherein the set of group-based tasks corresponds to a set of coordinated devices in communication with a coordinator device;

associating the individual requests to execute group-based tasks with execution of respective on-demand code in the coordinated environment based at least in part on configuration information for a set of group-based tasks;

causing execution of instantiated on-demand code in response to a request from a coordinated device to execute a group-based task;

generating a processing result corresponding to the execution of the instantiated on-demand code; and transmitting the processing result to the coordinated device.

14. The method as recited in claim 13 further comprising receiving configuration information for a set of group-based tasks.

15. The method as recited in claim 13 further comprising causing the instantiation of on-demand code associated with at least one of the group-based tasks.

16. The method as recited in claim 13, wherein associating the individual requests to execute the group-based tasks with the respective on-demand code includes associating the individual requests with the respective on-demand code based on organizational criteria.

17. The method as recited in claim 13 further comprising managing the execution of the instantiated on-demand code by maintaining a work queue regarding state information for the execution of the instantiated on-demand code.

18. The method as recited in claim 13 further comprising managing the execution of the instantiated on-demand code by causing termination of at least one execution of the instantiated on-demand code.

19. The method as recited in claim 13 further comprising:
receiving a request from the one or more coordinated devices to execute on-demand code not associated with group-based tasks;
causing execution of the on-demand code not associated with group-based tasks;
generating a second processing result corresponding to the execution of the on-demand code not associated with group-based tasks; and
transmitting the second processing result to the one or more coordinated devices.

20. The method as recited in claim 13, wherein the on-demand code corresponds to one or more operating system level tasks.

* * * * *